United States Patent
Culp

(10) Patent No.: US 6,249,003 B1
(45) Date of Patent: Jun. 19, 2001

(54) IMAGING ATTENUATION CORRECTION METHOD EMPLOYING MULTIPLE ENERGY SCAN MASKS AND WINDOWS

(75) Inventor: Randall F. Culp, New Berlin, WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/336,665

(22) Filed: Jun. 18, 1999

(51) Int. Cl.$^7$ .................................................. G01T 1/161
(52) U.S. Cl. .............................. 250/363.04; 250/363.02
(58) Field of Search .......................... 250/363.02, 363.04

(56) References Cited

U.S. PATENT DOCUMENTS

| | | | |
|---|---|---|---|
| 4,755,679 | * | 7/1988 | Wong ................................ 250/363.03 |
| 5,608,221 | * | 3/1997 | Bertelsen et al. ................ 250/363.03 |
| 5,936,247 | * | 8/1999 | Lange et al. ..................... 250/363.03 |
| 6,140,649 | * | 10/2000 | Lonn ................................ 250/363.04 |
| 6,194,724 | * | 2/2001 | Kaoukab Raji ................. 250/363.04 |

* cited by examiner

Primary Examiner—David P. Porta
Assistant Examiner—Allen C. Ho
(74) Attorney, Agent, or Firm—George E. Haas; Quarles & Brady LLP

(57) ABSTRACT

An apparatus for generating gamma transmission and gamma emission images simultaneously includes a camera and a line transmission source of gamma radiation disposed on opposite sides of an imaging area in which a patient lies. The line detector moves along a path that substantially traverses the field of view of the gamma camera. As the gamma camera moves an acceptance region and a mask region are electronically defined and moved across the camera's field of view. Photons striking the camera are categorized according to their energy and the region of impingement. The categorization defined an emission image, a transmission image and a crosstalk image. The transmission and crosstalk images are combined to form a corrected transmission image that then is used along with the emission image to produce and image of the patient.

7 Claims, 2 Drawing Sheets

IMAGING ATTENUATION CORRECTION METHOD EMPLOYING MULTIPLE ENERGY SCAN MASKS AND WINDOWS

BACKGROUND OF THE INVENTION

The present invention relates to medical imaging cameras, and more specifically to imaging systems which include a mechanism for determining emission attenuation to compensate emission images for varying patient densities.

Single photon emission computed tomography (SPECT) examinations are carried out by injecting a dilution marker comprising a compound labeled with a radiopharmaceutical tracer into the body of a patient to be examined. The radiopharmaceutical is a substance that emits photons of gamma radiation at a specific energy level. By choosing a compound that will accumulate in an organ to be imaged, the compound concentration, and hence radiopharmaceutical concentration, can be substantially limited to that organ of interest. Thus measuring the intensity of the gamma rays emitted from the patient, enables identification of organ characteristics and irregularities.

A planar gamma camera is used to measure the intensity of the photon emission. That camera comprises a stand that supports a collimator, a scintillation crystal and a detector consisting of a two dimensional array of photomultiplier tubes (PMTs) in a adjacent to the patient. The collimator typically includes a lead block with tiny holes there through which define preferred photon paths. The scintillation crystal abuts the collimator on a side opposite the patient to absorb photons and emit light each time a photon is absorbed. The PMTs detect the light emitted by the scintillation crystal and respond by generating analog intensity signals corresponding to the energy level of each photon.

A processor receives the PMT signals and processes those having energy levels that are associated with photon emitted by the radiopharmaceutical tracer. The processor digitally stores emission information as a two dimensional array of pixels. The two dimensional array corresponds to the array of PMTs which the pixels forming a histogram of the number of photons of the proper energy levels detected by each PMT. The pixel information is used by the processor to form an emission projection image associated with the specific camera position.

Most gamma camera systems generate a plurality of emission projection images, each taken by positioning the detector parallel to, and at an angle about, a rotation axis. The angle is incremented between views so that the plurality of projection images can be used together to construct pictures of transaxial slices of the body using algorithms and iterative methods that are well known to those skilled in the tomographic arts.

Unfortunately, because different materials are characterized by different attenuation coefficients, photons are attenuated to varying degrees as they pass through various portions of a patient's body. For example, a given thickness of bone typically attenuates a greater percentage of photons than the same thickness of tissue. The organ image is degraded when the different anatomical features attenuate the radiation leaving the body, in effect casting shadows on the projection image. When the projection images taken at many different view angles are used to reconstruct a tomographic picture, these shadows create artifacts in the reconstructed picture.

To compensate for such artifacts a transmission measurement may be made by placing a calibrated radiation source on the opposite side of the patient from the gamma camera and measuring the amount of radiation that passes through the patient. This provides a measurement of how much of the known radiation is attenuated. The transmission radiation source emits gamma rays at a different energy level that is distinguishable from the radiopharmaceutical energy level, thus allowing the gamma camera to separately measure the emission received from each source. However, when imaging a patient using a radiopharmaceutical tracer that has a higher energy than the transmission source, scattered photons from the tracer can be reduced in energy and mistaken for transmission photons. This "crosstalk" contaminates the transmission image.

A previous approach that reduced the crosstalk effects involved "masking"—electronically defining an acceptance window on the detector. Radiological events outside the acceptance window were masked, or rejected, from further processing. The acceptance window moves in correspondence with a scanning transmission line source so that the window instantaneously exposes the area on the detector where transmission events are expected to occur. Although this masking reduces the crosstalk, it does not eliminate the need for some crosstalk correction.

The simplest way to acquire the needed data is to first perform a complete tomographic acquisition which only accepts emission data (i.e. photons at energy levels from the radiopharmaceutical tracer). During this time an image also can be acquired using the transmission energy levels, but with the transmission gamma source inactive. This latter image provides a measurement of the activity that scatters from the tracer and appears in the transmission energy range which then is used to correct crosstalk in the transmission image. A second acquisition is performed during which the transmission source is swept across the detector field of view at each view angle. The transmission events within the transmission energy range and within the mask acceptance range are detected. While this technique provides a simple process for eliminating crosstalk, it requires two rotations of the detector assembly and prolongs the patient's stay in the imaging system. In addition, the method is susceptible to errors resulting from movement of the patient between the two acquisitions.

SUMMARY OF THE INVENTION

A typical medical imaging system, with which the present invention can be used, produces an image from emission of photons at a first energy level from a radiopharmaceutical tracer injected into the patient. The system includes a camera and a line radiation source. The camera has a two dimensional array of radiation detectors arranged in rows and the line radiation source moves across the rows of radiation detectors while emitting photons at a second energy level. An event occurs when a given photon strikes one of the radiation detectors.

The present image compensation method designates at least one row of radiation detectors as an acceptance region of the camera and designating other rows of radiation detectors as a mask region. Each event is categorize as either an emission event, a transmission event or a crosstalk event. Emission events occur when the given photon has an energy level in a range that includes the first energy level and strikes the mask region. An event is catagorize as a transmission event when the given photon has an energy level in a range that includes the second energy level and that event occurs in the acceptance region. Crosstalk events are defined as produced by photon that has an energy level in a range that includes the second energy level and which strikes the camera in the mask region. Information about each emission event, transmission event and crosstalk event is stored in a separate memory area for each type of event.

The acceptance and mask regions are periodically redesignated as the line radiation source moves across the camera's field of view. The dynamically defined regions continue to be used to categorize the events until the line radiation source has traversed the entire field of view of the camera. Thereafter, a corrected transmission image is produced by combining information about transmission events and crosstalk events. In the preferred imaging system the corrected transmission image is used to compensate the emission image which depicts the desired anatomical feature of the patient.

DETAILED DESCRIPTION OF THE INVENTION

A. Hardware Configuration

Figure 1:
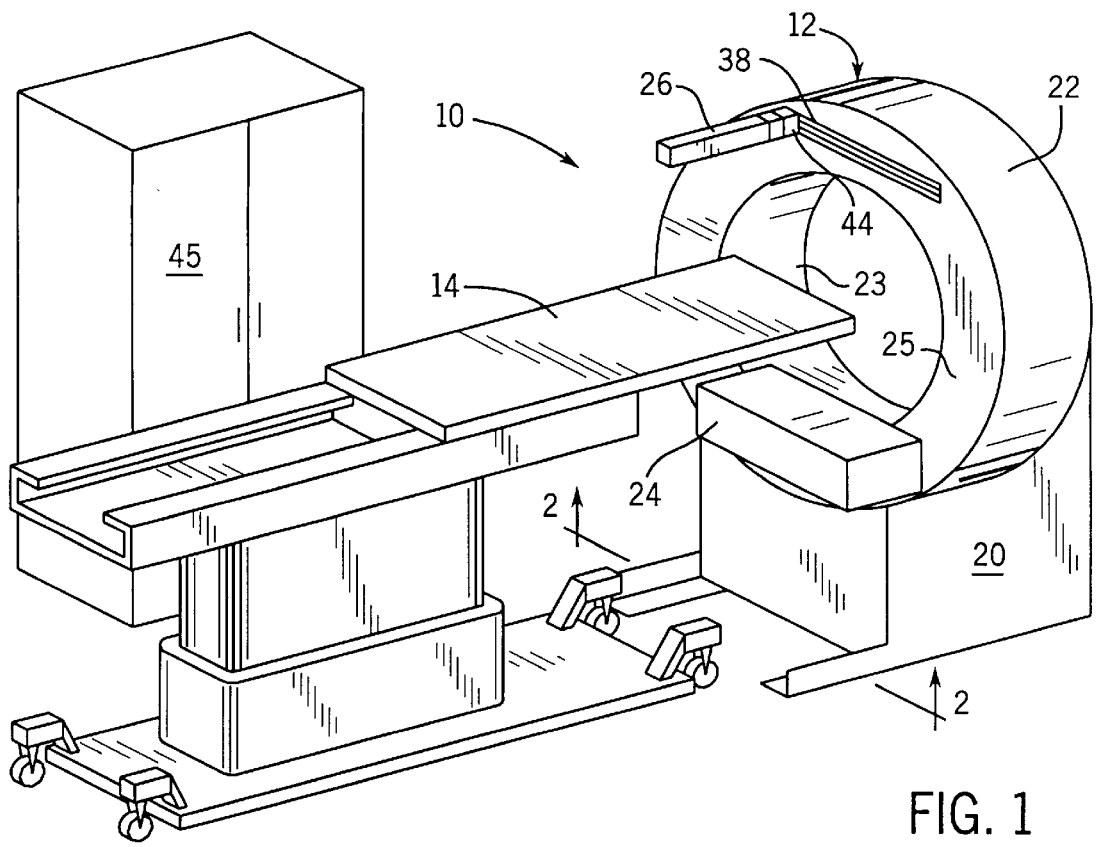
FIG. 1 is an isometric view of an imaging system employing the present invention.
Figure 2:
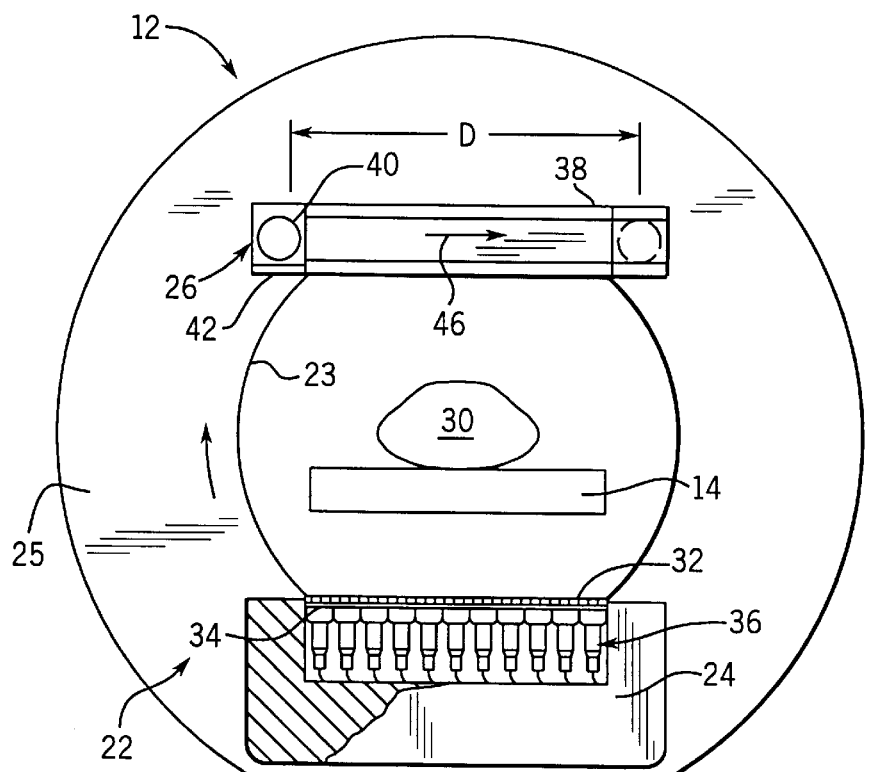
FIG. 2 is a cross sectional view taken along the line 2—2 of FIG. 1.

With initial reference to FIGS. 1 and 2, an imaging system 10 includes a tomographic assembly 12 and a patient support table 14 which is transparent to gamma radiation. The support table 14 includes platform for supporting a patient in a manner that enables the patient to be moved into and out of the field of view of the tomographic assembly 12.

The tomographic assembly 12 includes a pedestal 20 with a gantry 22 mounted thereon. The gantry 22 is annular shaped with a central opening 23 for receiving an end of the table 14 and the patient lying thereon. A planar gamma camera 24 and gamma radiation line source 26 are supported on the front surface 25 of the gantry 22 in a manner that allows those components to rotate about the end of the table 14 to acquire a series of projection images of the patient at different angular positions. The pedestal 20 houses a motor for rotating the gantry 22 ideally through 540° of rotation and, at a minimum through 360°.

Referring to FIG. 2, the gamma camera 24 detects and identifies coordinates of gamma emissions from the patient 30. The camera 24 includes a lead plate 32 with a myriad of fine holes perpendicular to its surface that faces the patient thereby acting as a collimator defining parallel radiation paths there through. A scintillation crystal 34 is positioned behind the collimator plate 32 to absorb gamma emissions passing through the holes. The scintillation crystal 34 produces light with an intensity that corresponds to the level of gamma radiation impingement. The emitted light is directed toward an array of closely packed photomultiplier tubes (PMTs) which are collectively designated by numeral 36. The array is organized in rows and columns of photomultiplier tubes with each tube having a unique location, or address, designated by row and column numbers. Each dimension of the actual array contains a greater number of photomultiplier tubes 36 than are illustrated in FIG. 2.

Detected light emissions cause the PMTs 36 to produce analog electrical signals which are sent to a processor 45 (FIG. 1) that uses the signals to compute two dimensional coordinates of each gamma emission absorbed in terms of analog signal magnitudes. Conventional hardware and techniques are employed to compute these coordinates in terms of the analog photomultiplier signals. One scheme for determining the coordinates of each gamma emission is described in U.S. Pat. No. 4,142,102 which is incorporated herein by reference.

The line radiation source 26 projects perpendicularly from a track 38 located on the front surface 25 of the gantry 22. The line source 26 includes an elongated generator 40 of gamma radiation and a collimator 42 which allows gamma transmissions to exit the source only in a direction that is toward the gamma camera 24 perpendicular to the length of the generator. The generator 40 is designed to emit a line of gamma particles at an energy level that is appreciably different than the energy level of the photon emissions produced by the radiopharmaceutical injected into the patient 30.

The line radiation source 26 is mounted at its proximal end 44 for movement along the track 38 on the side of the patient that is opposite the gamma camera 24. The track 38 is centered with respect to the central opening 23 of the gantry 22 and substantially traverses the face of the gamma camera 24. A driver or motor (not shown) moves the line radiation source 26 a distance D along the track 38 in a controlled manner.

B. Operation

In order to acquire an image, a radiopharmaceutical tracer is injected into a patient's blood stream. After waiting for the radiopharmaceutical to become concentrated in the organ to be imaged, the patient reclines on the table 14 which is manipulated until the patient 30 is positioned generally concentrically within the gantry 22. Once the patient is properly positioned, image acquisition may commence.

During imaging, both radiopharmaceutical emission data and line source transmission data are acquired to generate emission and transmission images at a plurality of angles about the patient 30.

At each imaging angle, the line source 26 initially is positioned at one end of the track 38. During each imaging period, line source moves along the entire length of the track 38 in the direction indicated by arrow 46. While this is occurring the gamma camera 24 is receiving gamma photons from both the radiopharmaceutical, that has been injected into the patient 30, as well as photons from the line source 26 which different types of photons have two distinct energy levels. An "event" occurs when a photon is detected by one of the photomultiplier tubes in array 36. In response, the photomultiplier tube produces an electrical signal which is sent to the processing circuitry 45 of imaging system 10.

The processing circuitry first determines whether the magnitude of the signal indicates that the photon is in an energy range which corresponds to the photons from either the line source 26 or the radiopharmaceutical. In addition to providing a signal indicating the energy level of the impinging gamma photon, the gamma camera 24 also provides a spatial indication as to where in the two dimensional array of photomultiplier tubes 36, the photon was received. The present invention utilizes an electronic mask to catagorize the photons based upon the locations of impingement upon the photomultiplier array.

Figure 3:
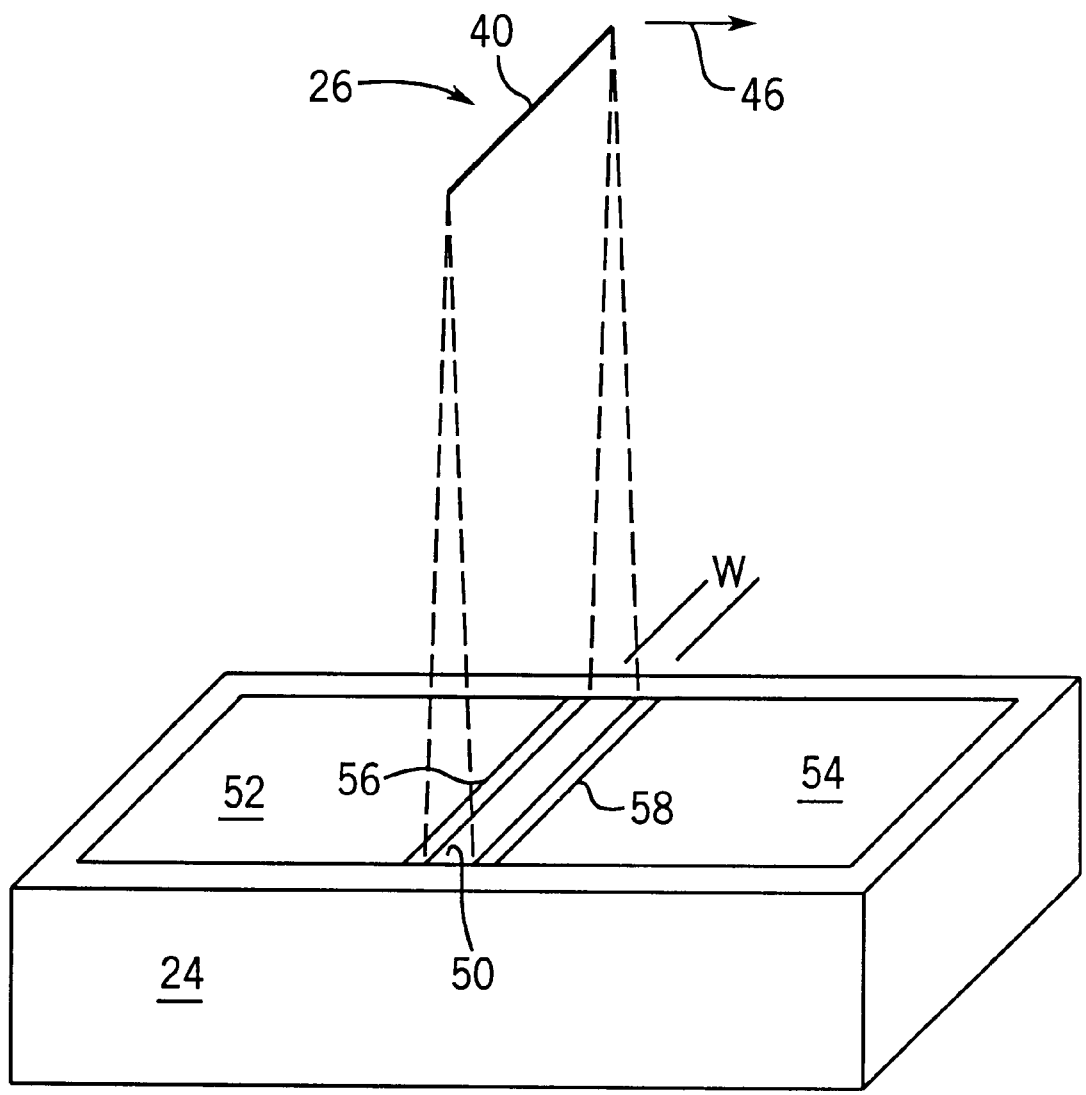
FIG. 3 schematically depicts the electrically masking of the radiation detector according to the present invention.

FIG. 3 schematically depicts the line source 26 and its linear gamma radiation generator 40 moving in direction 46 above the gamma camera 24. The signal processor 45 electronically divides the two dimensional array of photomultiplier tubes 36 into several regions. The first is a slot-like acceptance region which is parallel to the line source 26 and has a constant width W, thus creating a region where the line source photons are collimated onto the field of view of the camera. This acceptance region 50 corresponds to an area of the field of view of the camera 24 at which photons from the transmission line source 26 are expected to be detected. The acceptance region 50 is moved electronically across the photomultiplier tube array 36 in coincidence with the movement of the line source 26.

Mask regions 52 and 54 are defined electronically on opposite sides of the rectangular acceptance region 50 in the photomultiplier tube array. These mask regions correspond to areas of the array at which photons from the transmission line source 26 normally should not be detected. In the preferred embodiment, narrow boundary regions 56 and 58 are formed at the interfaces between the acceptance region 50 and each of the mask regions 52 and 54. As will be described, no gamma radiation events will be accepted by photomultiplier tubes within these boundary regions.

The acceptance region 50 and boundary regions 56 and 58 have a constant shape and size as they are electronically scanned across the camera, row-by-row in synchronism with the physical movement of the line source 26. As this occurs, the relative size of the two mask regions 52 and 54 changes. At the beginning of the scan, there is no mask region 52 when the line source 26 is at the beginning end of its travel and the other boundary region 54 is at a maximum size extending across the majority of the face of the camera. During the imaging period as the line source 46 moves across the patient, the first mask region 52 enlarges in size while the second mask region 54 decreases in size. The electronic scanning of the various regions is performed by maintaining tables of row addresses of the detectable locations in the array 36. A separate table contains the range of row addresses for each region and the row addresses in each range are incremented to scan the associated region across the gamma camera. Thus when an event is detected by the photomultiplier array, its row address is compared to the address tables to determine the present region in which it lies.

The mask and acceptance regions so defined electronically by the processor 45 are employed to categorize each event from the gamma camera 24 as an emission event, a transmission event or a crosstalk event. An "emission event" is defined as an event caused by a photon having an energy level that is within a range corresponding to the energy of photons emitted by the radiopharmaceutical tracer, for example, a range of ±10% of the radiopharmaceutical photon energy level. If the energy of the radiopharmaceutical tracer photons is below that of the transmission line source photons, an additional constraint is applied in that the event must occur within one of the mask regions 52 or 54. "Transmission events" are those events which have an energy level that falls within a range associated with photons emitted by the line source 26, for example ±10% of the energy level of photons emitted by that source. The transmission event also must occur at a detected location which is within the acceptance region 50 of the camera 24. "Crosstalk events" are those produced by photon which have energy that falls within the transmission energy range, but which occur at detected locations within one of the two mask regions 52 or 54 in the field of view of camera 24. Any events which occur within the two boundary regions 56 and 58 are discarded from processing. By making use of these various regions that are electronically defined in the gamma camera's field of view, the advantages of a sequential scan and a simultaneous scan can be fully combined.

A separate two dimensional array in the memory of the processor 45 is defined to tabulate the occurrences of each event type. That is, there is a separate matrix of memory locations for emission events, transmission events, and crosstalk events. Each memory matrix has a separate storage location which corresponds to each detectable location within the two dimensional detector array, and thus forms an image from the respective events. As the processor 45 categorizes each type of event based on its spacial position in the photomultiplier array 36 and its energy level, a histogram is created within the associated memory matrix which counts a number of events which occur at each detectable location.

At the culmination of each imaging period at one of the angles about the patient 30, the three memory matrices contain the data related to one projection image of the patient. The transmission scan time is the period during which the transmission line source 26 is swept across the gamma camera's field of view. The only constraint on the acquisition is that the transmission scan time is less than or equal to the acquisition time for the emission image produced by the radiopharmaceutical tracer. The shorter the transmission time, the less crosstalk and contamination in the transmission scan and the better the attenuation mapping will be. Therefore it is desirable to use a high-activity source for the transmission line source 26 with a short sweep time.

When the scan is complete, at least three images have been acquired at each view, or angle about the patient 30, one for the emission data, one for crosstalk data, and one for transmission data. The transmission images then are corrected to remove the crosstalk.

Specifically a corrected transmission image (CTI) is produced utilizing the following formulas:

$$C_m = \frac{\text{Acceptance Region Width}}{\text{Line Source Travel Distance}}$$

$$C_t = \frac{\text{Transmission Scan Time}}{\text{Emission Scan Time}}$$

$$CTI = \text{Transmission Image} - \text{Crosstalk Image} \times C_t \times \frac{C_m}{1 - C_m}$$

After the transmission data has been corrected and stored, the image processor 45 forms initial emission images and corresponding initial transmission images using iterative algorithms that are well-known in the art. After initial images have been developed, the initial transmission images can be used to generate an attenuation map indicating non-uniform attenuation. Next, the processor can use both the initial emission images and the attenuation map to compensate the initial emission images for non-uniform attenuation throughout the imaged portion of the patient's body to generate corrected emission images. Methods and apparatus for combining emission images and attenuation maps are well known in the art and therefore will not be explained in detail here. Any method for combining emission and attenuation data may be used, such as the method described in U.S. Pat. No. 5,337,213 which is incorporated herein by reference. Then, the corrected emission images can be combined by a computer to provide accurate tomographic images of the imaged organ.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

I claim:

1. A method of compensating for artifacts in images produced by a medical imaging system from emission of photons at a first energy level from a radiopharmaceutical tracer, the medical imaging system including a camera which has a two dimensional array of radiation detectors arranged in rows and which includes a line radiation source that moves across the rows of radiation detectors with the line radiation source emitting photons at a second energy level, wherein an event occurs when a given photon strikes the array of radiation detectors; the method comprises steps of:

(a) designating a first region of the array of radiation detectors as an acceptance region of the camera, wherein the first region is parallel to the line radiation source;

(b) designating a second region of the array of radiation detectors as a mask region of the camera;

(c) categorizing an event as an emission event when the given photon has an energy level in a range associated with the first energy level and which occurs in the mask region;

(d) categorizing an event as a transmission event when the given photon has an energy level in a range that includes the second energy level and which occurs in the acceptance region;

(e) categorizing an event as a crosstalk event when the given photon has an energy level in a range that includes the second energy level and which occurs in the mask region;

(f) storing information about each emission event, transmission event and crosstalk event in a separate memory area for each type of event; and (g) redesignating the acceptance region of the camera;

(h) redesignating the mask region;

(i) repeating steps (c)–(f) while the line radiation source continues to move across the rows of radiation detectors; and (j) producing a corrected transmission image by combining information about transmission events and crosstalk events.

2. The method as recited in claim 1 wherein producing the corrected transmission image comprises subtracting information about crosstalk events from information about transmission events.

3. The method as recited in claim 1 wherein the corrected transmission image is produced according the following expressions:

$$C_m = \frac{\text{Acceptance Region Width}}{\text{Line Source Travel Distance}}$$

$$C_t = \frac{\text{Transmission Scan Time}}{\text{Emission Scan Time}}$$

$$CTI = \text{Transmission Image} - \text{Crosstalk Image} \times C_t \times \frac{C_m}{1 - C_m}$$

where the transmission scan time is a period that photon are emitted by the line radiation source, and the emission scan time is a period during which information regarding emission events is stored.

4. The method as recited in claim 1 further comprising:

designating a third region of the array of radiation detectors between the acceptance region and the mask region as a boundary region; and rejecting events that occur in the boundary region from further processing by the imaging system.

5. A method of compensating for artifacts in images produced by a medical imaging system from emission of photons at a first energy level from a radiopharmaceutical tracer, the medical imaging system including a gantry on which a gamma camera and a line source of gamma radiation are mounted for receiving there between a patient to be imaged, the gamma camera which has a two dimensional array of radiation detectors arranged in rows and the line source of gamma radiation that moves across the rows of radiation detectors and emits photons at a second energy level, wherein an event occurs when a given photon strikes the radiation detector array; the method comprises steps of:

(a) positioning the gamma camera and line source at first angular position with respect to the patient;

(b) designating a region of the radiation detector array as an acceptance region of the gamma camera, wherein the acceptance region is parallel to the line source;

(c) designating another region of the radiation detector array as a mask region of the gamma camera;

(d) categorizing an event as an emission event when the given photon has an energy level in a range that includes the first energy level and which occurs in the mask region;

(e) categorizing an event as a transmission event when the given photon has an energy level in a range that includes the second energy level and which occurs in the acceptance region;

(f) categorizing an event as a crosstalk event when the given photon has an energy level in a range that includes the second energy level and which occurs in the mask region;

(g) storing information about each emission event, transmission event and crosstalk event in a separate memory area for each type of event; and (h) redesignating the acceptance region of the gamma camera;

(i) redesignating the mask region;

(j) repeating steps (d)–(g) while the line source moves across the rows of radiation detectors;

(k) producing a corrected transmission image by combining information about transmission events and crosstalk events;

(l) rotating the gantry to locate the gamma camera and line source at a second angular position with respect to the patient; and (m) repeating steps (b)–(k).

6. The method as recited in claim 5 wherein the corrected transmission image is produced according the following expressions:

$$C_m = \frac{\text{Acceptance Region Width}}{\text{Line Source Travel Distance}}$$

$$C_t = \frac{\text{Transmission Scan Time}}{\text{Emission Scan Time}}$$

$$CTI = \text{Transmission Image} - \text{Crosstalk Image} \times C_t \times \frac{C_m}{1 - C_m}$$

where the transmission scan time is a period that photon are emitted by the line source, and the emission scan time is a period during which information regarding emission events is stored.

7. The method as recited in claim 5 further comprising:

designating at least one row of radiation detectors between the acceptance region and the mask region as a boundary region; and rejecting events that occur in the boundary region from further processing by the imaging system.

* * * * *